(12) United States Patent
Diab et al.

(10) Patent No.: US 8,503,474 B2
(45) Date of Patent: Aug. 6, 2013

(54) SYSTEM AND METHOD FOR ENHANCED PHYSICAL LAYER DEVICE INTERFACE CAPABILITY FOR BACKWARD SUPPORT OF FAST RETRAIN

(75) Inventors: Wael William Diab, San Francisco, CA (US); Michael Grimwood, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 324 days.

(21) Appl. No.: 12/902,967

(22) Filed: Oct. 12, 2010

(65) Prior Publication Data

US 2011/0305246 A1 Dec. 15, 2011

Related U.S. Application Data (60) Provisional application No. 61/354,237, filed on Jun. 13, 2010.

(51) Int. Cl.
*H04L 12/43* (2006.01)

(52) U.S. Cl.
USPC ............ 370/458; 370/469; 370/252; 370/230

(58) Field of Classification Search
USPC ................... 370/458, 469, 252, 230
See application file for complete search history.

(56) References Cited

U.S. PATENT DOCUMENTS

| | | | | |
|---|---|---|---|---|
| 7,826,360 | B1* | 11/2010 | Hutchison | 370/230 |
| 2008/0089433 | A1* | 4/2008 | Cho et al. | 375/267 |
| 2008/0192631 | A1* | 8/2008 | Ardhanari et al. | 370/230.1 |
| 2010/0177783 | A1* | 7/2010 | Kumar et al. | 370/438 |
| 2010/0262848 | A1* | 10/2010 | Bobrek et al. | 713/320 |
| 2011/0205934 | A1* | 8/2011 | Ungerboeck et al. | 370/254 |

* cited by examiner

*Primary Examiner* — Gary Mui
*Assistant Examiner* — Lan Truong
(74) *Attorney, Agent, or Firm* — Duane S. Kobayashi (57) ABSTRACT

A system and method for enhanced physical layer device interface capability for backward support of fast retrain. The enhanced physical layer device is configurable in its leveraging of an identified legacy signaling mechanism. The identified legacy signaling mechanism can be used by the enhanced physical layer device to suspend transmission by the media access control device to facilitate the fast retrain.

16 Claims, 6 Drawing Sheets

SYSTEM AND METHOD FOR ENHANCED PHYSICAL LAYER DEVICE INTERFACE CAPABILITY FOR BACKWARD SUPPORT OF FAST RETRAIN

This application claims priority to provisional patent application No. 61/354,237, filed Jun. 13, 2010, which is incorporated by reference herein, in its entirety, for all purposes.

BACKGROUND

Field of the Invention

The present invention relates generally to Ethernet systems and, more particularly, to a system and method for enhanced physical layer device interface capability for backward support of fast retrain.

INTRODUCTION

Ethernet is a network communication standard that is used widely in communicating information between computers and other electronic devices. One example is for physical layer devices (PHYs) such as 10GBASE-T where noise mitigation techniques may be used such as those defined by IEEE Std 802.3 and its amendments. In general 10GBASE-T PHYs allow 10 gigabit/second connections over unshielded or shielded twisted pair cables, over distances up to 100 meters.

Maintaining network communication at such speeds is dependent on the training and retraining of filter coefficients (e.g., Near End Crosstalk (NEXT) cancellers, Far End Crosstalk (FEXT) cancellers, equalizers and echo cancellers) that are adapted to the particular communication channel. In this environment, what is needed is a mechanism that enables fast retraining in physical layer devices (PHYs), which interface with legacy media access controllers (MACs).

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

A system and method for enhanced physical layer device interface capability for backward support of fast retrain, substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

10GBASE-T PHYs provide a fast retrain mechanism that enables the PHYs to deal with noise disruption on the link by re-converging their filter coefficients. One of the challenges in supporting such a fast retrain mechanism is the PHY's temporary inability to transmit data over the link until the fast retrain process completes. During this time, the PHYs can choose options such as dropping the link or dropping data. Coordination and implementation of these actions is a key issue. This is especially true when considering the interoperation of PHYs with legacy MACs.

It is a feature of the present invention that a PHY supporting fast retrain can implement programmability that determines the behavior of the PHY during fast retrain. In one embodiment, the programmability of the PHY is facilitated by a configuration register, the contents of which determine the actions a PHY takes under fast retrain. Where the PHY interfaces with a legacy MAC that may not support any new signaling, the PHY can signal a need for the legacy MAC to halt transmission during fast retrain using supported legacy signaling mechanisms. Examples of such supported legacy signaling mechanisms include carrier deferral, PAUSE frames, LOCAL or REMOTE FAULT signaling, sequence ordered sets, etc. Additionally, signaling can also be supported by an external wire on the PHY. More generally, any in-band or out-of-band signaling mechanism that can be established with a legacy MAC can be used, whether or not the signaling mechanism was specifically designed to support fast retrain in the PHY. In one embodiment, remote management (e.g., SNMP) can also be implemented to effect the programmability of the PHY.

Of note here is that an existing signaling mechanism known by the legacy MAC can be leveraged by the fast retrain PHY based on programmability of the fast retrain PHY. This programmability enables a PHY to interoperate with various legacy MACs in a manner that facilitates a PHY's fast retrain process without requiring standardized fast retrain signaling to be supported by the legacy MACs.

Figure 1:
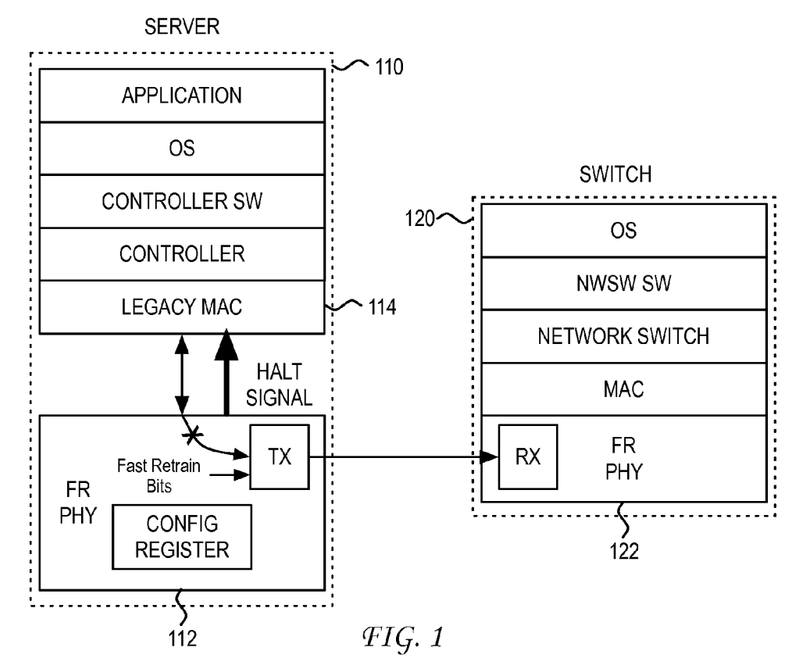
FIG. 1 illustrates an example of an end-to-end link that enables fast retrain functionality.
Figure 2:
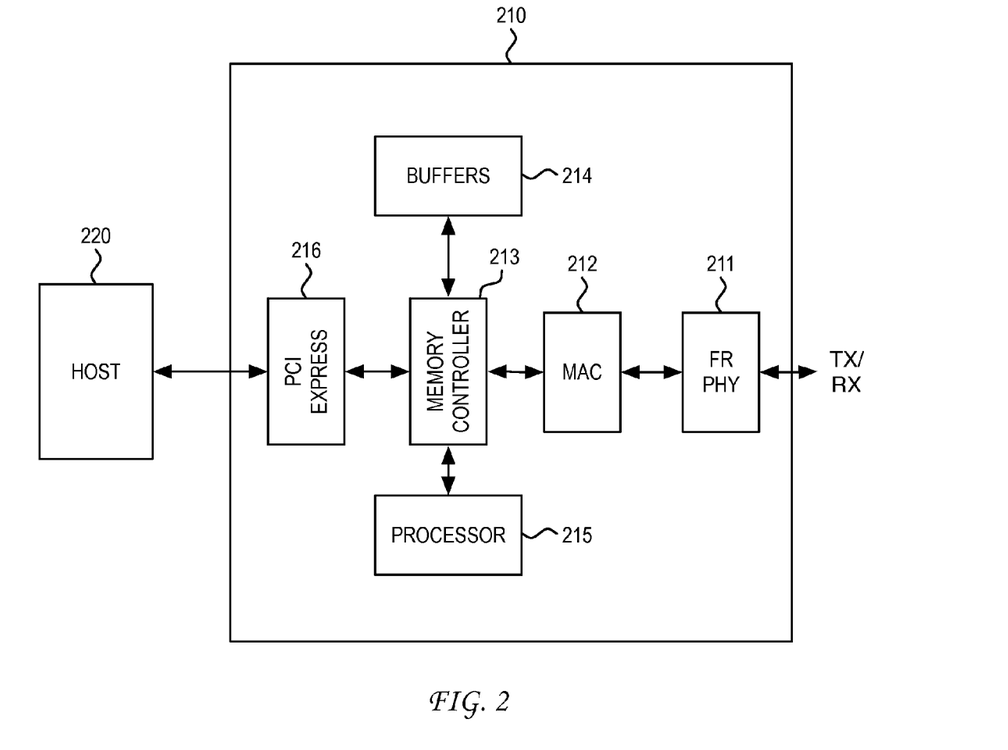
FIG. 2 illustrates an example of a controller.

Prior to describing the details of the present invention, a brief description of an example end-to-end link environment is provided with reference to FIG. 1. As illustrated, server 110 is coupled to switch 120 by a link supported by fast retrain PHYs 112, 122. FIG. 2 illustrates one example of a controller such as that within server 110. As would be appreciated, a controller can generally be part of a client (e.g., laptop, desktop or workstation), a server (e.g., audio-video (AV) server, high performance computing (HPC) server), or a consumer edge device (e.g., HDTV, Blueray, etc.). As illustrated, host system 220 is coupled to integrated Ethernet controller 210. Ethernet controller 210 further includes fast retrain PHY 211, which is coupled to MAC 212. In the illustrated example, MAC 212 is coupled to PCI Express device 216 via memory controller 213, which is also coupled to buffers 214 and processor 215.

Figure 3:
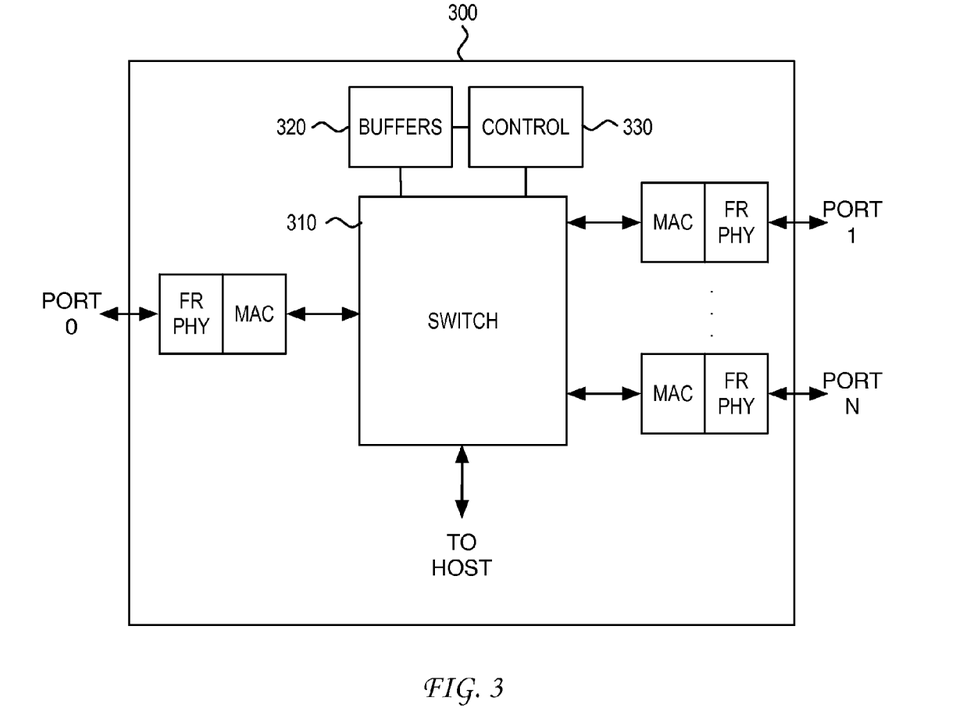
FIG. 3 illustrates an example of a switch.

FIG. 3 illustrates one example of a network switch. In various examples, switching system 300 can represent a router or any other device that incorporates multi-port switch functionality. In various examples, the switch can be a consumer, SMB, enterprise, metro, or access switch. In another example, switching system 300 can represent a voice over IP (VoIP) chip that has a network interface (Port 0) and a PC interface (Port 1). In yet another example, switching system 300 can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, switching system 300 can represent an access point such as a WLAN base station. As illustrated, switching system 300 includes switch 310 that supports a host connection (e.g., internal port) and a plurality of external ports 0-N via MAC and fast retrain PHY interfaces. Switch 310 is also supported by buffers 320 and control 330.

In the illustration of FIG. 1, only a single direction of a full duplex link is shown where a transmitter in fast retrain PHY 112 in server 110 transmits traffic to a receiver in fast retrain PHY 122 in switch 120. As would be appreciated, the principles of the present invention can be applied to both directions of the link.

In the example of FIG. 1, fast retrain PHY 112 interfaces with legacy MAC 114, which does not support signaling specifically defined for a fast retrain function. As such, legacy MAC 114 would be unable to support a fast retrain function at the PHY layer.

In response to a noise condition, fast retrain by the PHY can be used to re-converge the filter coefficients (e.g., echo, NEXT, FEXT, equalizers, etc.). As would be appreciated, a PHY can initiate a fast retrain for any reasons and may not be limited to noise mitigation. As illustrated in FIG. 1, fast retrain bits would need to be sent for use by fast retrain PHYs 112, 122 in re-establishing the filter coefficients. Passage of these fast retrain bits would therefore require the MAC to hold off transmission of the frames until the fast retrain process has completed. As illustrated in FIG. 1, a MAC can hold of transmission of frames during the fast retrain process based on a halt signal received from the fast retrain PHY.

In one embodiment, a PHY can initiates a fast retrain process by sending a fast retrain signal. In one example such as draft std IEEE 802.3az, the fast retrain signal is defined as a special PAM2 sequence. In other proprietary implementations the PHY can send silence to signal the need for a fast retrain process. Upon initiation of the fast retrain process, the PHYs would then compute and send updated filter coefficients. Next, the PHYs would update their precoders (e.g., Tomlinson-Hirashima Precoder in IEEE Std 802.3) with the updated coefficients and adjust synchronization and other filters as needed. During each of these steps in the process, the link would be unavailable and the PHYs should hold off the MACs until the fast retrain process completes.

It should be noted that the usage of signaling that holds off the MAC enables the fast retrain process in the PHY to leverage available buffering in the MAC or higher layers. While this does not preclude buffering from also being included in the PHY, the leveraging of the available buffering in the MAC or higher layers supplements the limited buffering or absence of buffering in the PHY. This reduces the potential costs of implementation in PHYs that support a fast retrain process.

In accordance with the present invention, the holding off of the MAC during fast retrain process can be accommodated without requiring any modification of the legacy MAC. As would be appreciated, this feature of the present invention is significant due to the continuing need to couple fast retrain PHYs to an installed based of existing legacy MACs (e.g., where controller or switch chips integrate a MAC). Fast retrain benefits can therefore accrue to existing legacy devices without requiring an overhaul of the entire device.

It is a feature of the present invention that a fast retrain PHY can be programmable. For example, as illustrated in FIG. 1 fast retrain PHY 112 includes configuration register 112. This programmability of the fast retrain PHY using configuration register 112 enables the fast retrain PHY to determine how to alert a legacy MAC to a noise-induced fast retrain process where transmission of the MAC needs to be halted for a period of time. More specifically, the programmability of the fast retrain PHY using configuration register 112 can be used to determine how the fast retrain PHY responds to a noise-induced fast retrain process in sending a halt signal to the legacy MAC.

As noted above, legacy MACs do not support a specific signaling scheme designed for fast retrain. Without such fast retrain signaling support, the legacy MAC could not be alerted that the PHY has entered a fast retrain period, nor take specific action in support of the fast retrain period. Other than dropping the link, the only other option would be to lose the data that the MAC would continue to send to the PHY during the fast retrain period.

It is a feature of the present invention that programming in the fast retrain PHY can be used to select a particular legacy signaling mechanism that can generate a halt signal for the legacy MAC. As would be appreciated, a plurality of legacy signaling mechanisms may be available to effect a holding off of transmission of the MAC. The principles of the present invention are not dependent on a particular legacy signaling mechanism. Rather, the principles of the present invention provide a coordinated method by which the fast retrain PHY can interoperate with a legacy MAC in performing a fast retrain function.

In one example, the halt signal can be represented by a carrier deferral signal (CRS) that is designed to hold off the legacy MAC. Conventionally, the CRS has been used in half-duplex links to alert a deference element in the MAC that the medium is occupied and that transmission must be deferred. In the context of the fast retrain support of the present invention, the CRS is used not to signal that the medium is occupied with incoming data, but that the transmission is deferred for the transmission of fast retrain data. After the fast retrain process completes, the fast retrain PHY can deassert the CRS, thereby indicating that the medium is ready for use for the transmission of data. Effectively, the deassertion of the CRS would end the halt of the MAC's transmission. Significantly, the assertion and deassertion of the CRS leverages legacy MAC functionality in accommodating a fast retrain by the PHY.

Figure 4:
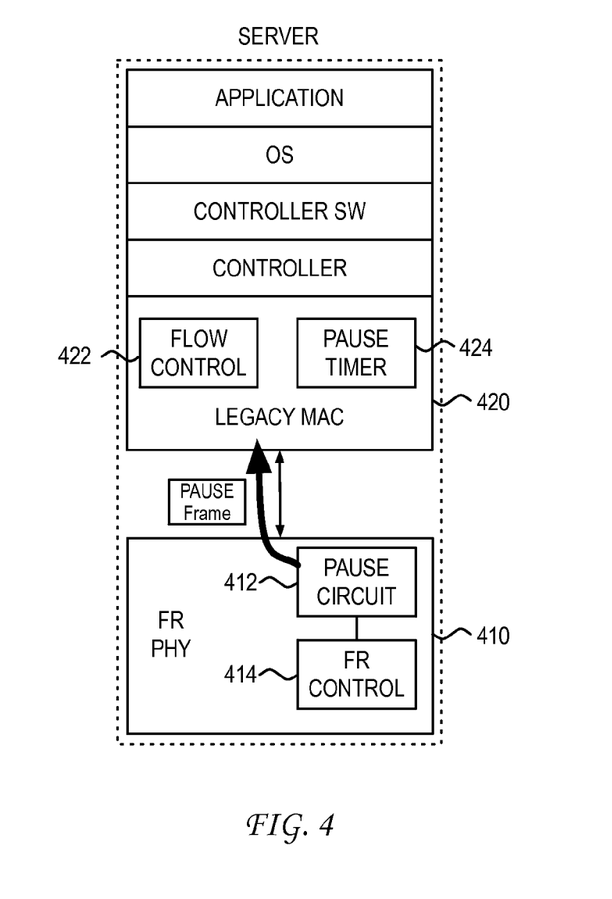
FIG. 4 illustrates an example of using a PAUSE frame during a fast retrain period.

In another example, the halt signal can be represented by a PAUSE frame. Conventionally, PAUSE frames can be generated by a far end device [remote/link partner] when, for example, a receive buffer in the far end device becomes full, thereby necessitating a request by the far end device that further transmissions be paused. In the present invention, PAUSE frames can be generated by a fast retrain PHY in the same device on the same side of the link in which transmissions are sought to be paused. Significantly, the generation of the PAUSE frames can be triggered upon entry into a fast retrain period by fast retrain control 414.

FIG. 4 illustrates an example of the use of PAUSE frames during a fast retrain period. As illustrated, a PAUSE frame can be sent by pause circuit 412 in fast retrain PHY 410 to legacy MAC 420. This PAUSE frame is used as a backpressure mechanism. This backpressure mechanism is facilitated by flow control 422 in legacy MAC 420. Upon receipt of the PAUSE frame, flow control 422 ceases further transmission until the expiration of pause timer 424. Suspension of further transmission causes traffic to accumulate in buffers within the server.

In one embodiment, pause timer 424 can be set to a value indicated by the PAUSE frame, thereby suspending transmissions for a specified period of time. In the context of fast retrain, this period of time can correspond to the amount of time needed to perform the fast retrain. In one embodiment, the suspended transmission can be restarted upon receipt of a PAUSE 0 frame.

Figure 5:
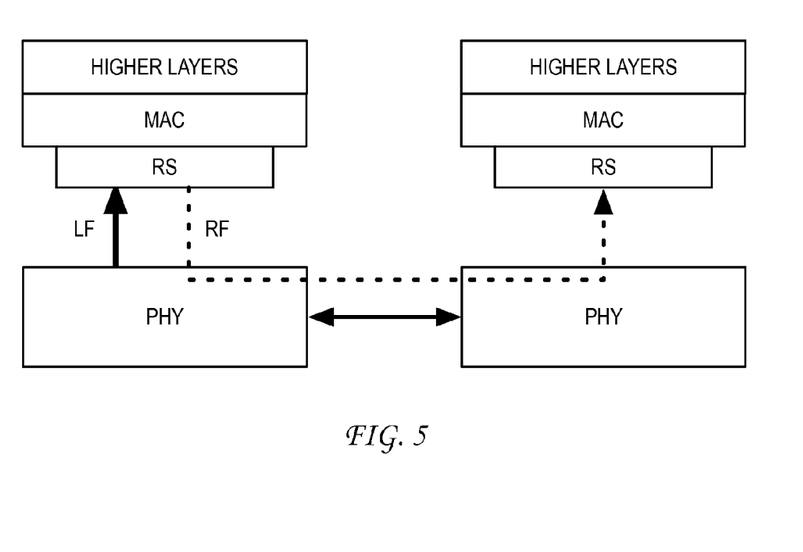
FIG. 5 illustrates a generation of a local fault signal.

In yet another example, the halt signal can be represented by a LOCAL FAULT (LF) or REMOTE FAULT (RF) type of link fault signaling. Conventionally, this link fault signaling mechanism resides in the reconciliation sublayer (RS) to monitor link status between a local RS and a remote RS. As illustrated in FIG. 5, a PHY can generate a LF signal to hold off the MAC during the fast retrain process. Conventionally, the RF signal is generated by the RS in response to the detection of the LF signal. In the present invention, the programmable mechanism that holds of the MAC can support either LF or RF signaling. Here, it should be noted that RF signaling has some advantages in that some legacy MACs will respond to a RF signal with IDLE instead of taking down the link.

In yet another example, the halt signal can be represented by control codes that can be tunneled through an existing interface (e.g., XAUI, XFI-type, xxMII or derivative interfaces) without generating errors. Since the control codes are out of the data path, the control codes would not affect the data and allow for quick action. In one embodiment, sequence or ||Q|| ordered sets can be used. In general, sequence ordered sets consist of a control character followed by three data characters. For example, the format /K28.4/Dx.y/Dx.y/Dx.y/ can be used, where the code group K28.4 has an octet value of 9C and D is any code group. Conventionally, sequence ordered sets have been used to communicate link status information such as the reporting of a local or remote fault. In the present invention, it is recognized that sequence ordered sets provide an advantageous tunneling mechanism to communicate fast retrain status information between a fast retrain PHY and a legacy MAC.

As has been described, a fast retrain PHY can trigger the generation of a halt signal that leverages existing flow control mechanisms in a unique manner. In an alternative embodiment, a software mechanism can be used to simulate the receipt of a fast retrain PHY's generated halt signal. For example, if the legacy MAC has a carrier deferral variable that is programmable, the software mechanism can "fake" the carrier deferral event and set the variable, thereby holding off the MAC. As such, the hardware halt signal mechanism need not actually be triggered to achieve the results that are effected in software.

As noted above, signaling can also be supported by an external wire on the PHY. Further, as the principles of the present invention are not dependent on a particular signaling mechanism, any in-band or out-of-band signaling mechanism that can be established with a legacy MAC can be used, whether or not the signaling mechanism was specifically designed to support fast retrain in the PHY.

Regardless of the particular mechanism used to signal a fast retrain period to a legacy MAC, the particular mechanism can be identified during operation through programmability of the fast retrain PHY. This programmability enables the fast retrain PHY to operate during the fast retrain period in a defined way in signaling such a condition to a legacy MAC. As would be appreciated, the particular programmed mechanism for signaling to the MAC can be chosen depending on the particular implementation of the legacy MAC. The programmability of the fast retrain PHY thereby enables the fast retrain PHY to operate with a variety of PHYs that have built-in support for various types of flow control mechanisms. Regardless of the particular flow control mechanisms supported by the MAC, the programmable fast retrain PHY can interoperate with the MAC in a defined way such that the PHY/MAC can avoid the dropping of the link or the loss of data.

Figure 6:
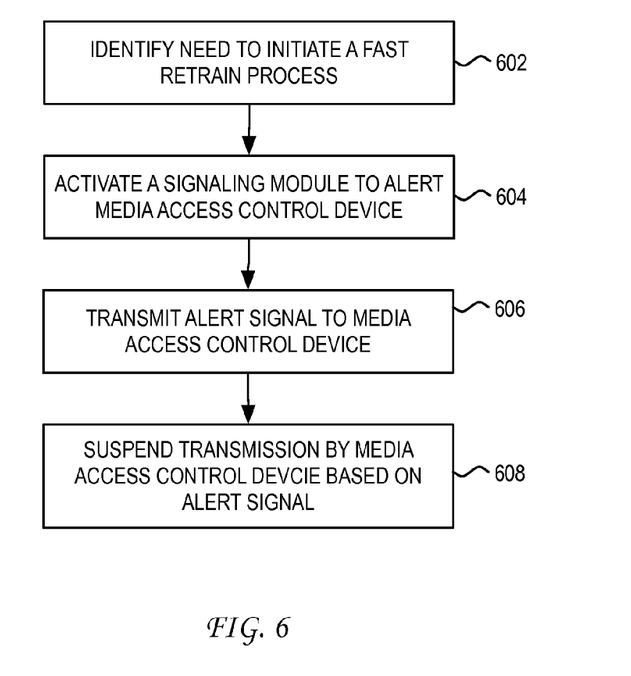
FIG. 6 illustrates a flowchart of a process of the present invention.

To further illustrate the principles of the present invention, reference is now made to the flowchart of FIG. 6, which illustrates a fast retrain process using a programmable fast retrain PHY. As illustrated, the process begins at step 602, where a need to initiate a fast retrain process is identified. As noted, a PHY can use the fast retrain process to address noise disruption on the link by re-converging the PHY's filter coefficients. The fast retrain process involves a mechanism for updating precoder coefficients and then appropriately adjusting synchronization and other filters. During the fast retrain process, to avoid loss of data, the MAC should suspend further transmission.

Prevention of a dropped link or lost data is based on signaling by the PHY to the MAC that transmission is to be suspended. In the present invention, the signaling is effected through an activation of a signaling module at step 604. For a legacy MAC, this signaling module is a legacy signaling mechanism that is not specifically designed for the fast retrain process. Rather, the signaling module is a chosen one of a variety of available legacy signaling mechanisms that can be leveraged by the fast retrain PHY.

In the present invention, the fast retrain PHY is programmable such that the legacy signaling mechanism is identified using a configurable parameter. In one embodiment, this configurable parameter is stored in a configuration register that is accessible by the fast retrain PHY.

Once the legacy signaling mechanism is identified using the configurable parameter, the fast retrain PHY can then proceed to transmit, at step 606, an alert signal to the MAC that transmission is to be suspended. Next, at step 608, the MAC suspends transmission based on the receipt of the alert signal. This suspension of the MAC transmission enables the fast retrain PHY to transmit fast retrain bits, which facilitates a re-convergence of the filter coefficients.

As has been described, the programmability of the PHY enables configuration of the PHY to facilitate operate with a legacy MAC. This configuration enables the PHY to leverage one of a plurality of legacy signaling mechanisms, whose impact on the MAC, can facilitate a particular function in the PHY. Standardized or otherwise prescriptive signaling between the PHY and MAC for the particular function is thereby obviated.

As would be appreciated, the principles of the present invention can be applied in various contexts beyond the fast retrain process support described above. For example, the principles of the present invention can be applied to other noise mitigation techniques that require the MAC to hold off. In another example, the principles of the present invention can be applied to an asymmetric PHY where the technique is used only in one direction (e.g., 10G PHY down, 1G PHY up for EthernetHD on a high definition TV set). The principles of the present invention can also be applied to MACSec PHYs.

Further, the principles of the present invention can be applied to various PHY types (e.g., backplane, twisted pair, optical, etc.), standard or non-standard (e.g., 2.5G, 5G, 10G, etc.) link rates, future link rates (e.g., 40G, 100G, etc.), as well as applications (e.g., DSL, PON, wireless, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A physical layer device that supports fast retrain, comprising:
    a configuration register that is configured to store information that enables an identification of one of a plurality of signaling mechanisms available for use by said physical layer device in signaling a media access control device that a fast retrain process is to commence; and
    a signaling module that is selectively activated by said physical layer device based on a retrieval of said stored information from said configuration register, said activated signaling module being configured to signal said media access control device that transmission by said media access control device is to be suspended, said suspension being proximate in time to an initiation of a fast retrain process by said physical layer device.

2. The physical layer device of claim 1, wherein said activated signaling module generates a pause frame.

3. The physical layer device of claim 1, wherein said activated signaling module generates a carrier deferral signal.

4. The physical layer device of claim 1, wherein said activated signaling module generates a sequence ordered set signal.

5. The physical layer device of claim 1, wherein said activated signaling module is implemented in software.

6. The physical layer device of claim 1, wherein the physical layer device is a 10GBASE-T physical layer device.

7. A fast retrain method, comprising:
    identifying a need to initiate a fast retrain process, said fast retrain process enabling a physical layer device to update filter coefficients;
    retrieving information that is stored in a configuration register in said physical layer device, said stored information enabling identification of one of a plurality of signaling mechanisms available for communication from said physical layer devise to a media access control device;
    selecting one of said plurality of signaling mechanisms based on said retrieved stored information from said configuration register;
    activating, by said physical layer device, a signaling module for said selected signaling mechanism to alert said media access control device coupled to said physical layer device of said initiation of said fast retrain process;
    transmitting, by said signaling module in said physical layer device, an alert signal to said media access control device;
    suspending transmission, by said media access control device to said physical layer device, based on a receipt of said alert signal from said physical layer device; and
    transmitting, by said physical layer device during said suspension, fast retrain bits to facilitate said fast retrain process.

8. The method of claim 7, wherein said transmitting comprises transmitting a pause frame.

9. The method of claim 7, wherein said transmitting comprises transmitting a carrier deferral signal.

10. The method of claim 7, wherein said transmitting comprises transmitting a sequence ordered set signal.

11. The method of claim 7, wherein said activating comprises activating a software module.

12. A fast retrain method in a physical layer device, comprising:
    identifying a need to initiate a fast retrain process, said fast retrain process enabling said physical layer device to update filter coefficients;
    retrieving information that is stored in a configuration register in said physical layer device, said stored information enabling identification of one of a plurality of signaling mechanisms available for communication from said physical layer device to a media access control device;
    selecting one of said plurality of signaling mechanisms based on said retrieved stored information from said configuration register;
    activating a signaling module for said selected signaling mechanism to alert said media access control device coupled to said physical layer device of said initiation of said fast retrain process; and
    transmitting, by said signaling module, an alert signal to said media access control device, said alert signal informing said media access control device that transmission by said media access control device should be suspended.

13. The method of claim 12, wherein said transmitting comprises transmitting a pause frame.

14. The method of claim 12, wherein said transmitting comprises transmitting a carrier deferral signal.

15. The method of claim 12, wherein said transmitting comprises transmitting a sequence ordered set signal.

16. The method of claim 12, wherein said activating comprises activating a software module.

* * * * *